F. E. HARVEY.
RESILIENT TIRE.
APPLICATION FILED NOV. 2, 1916.
1,259,734. Patented Mar. 19, 1918.
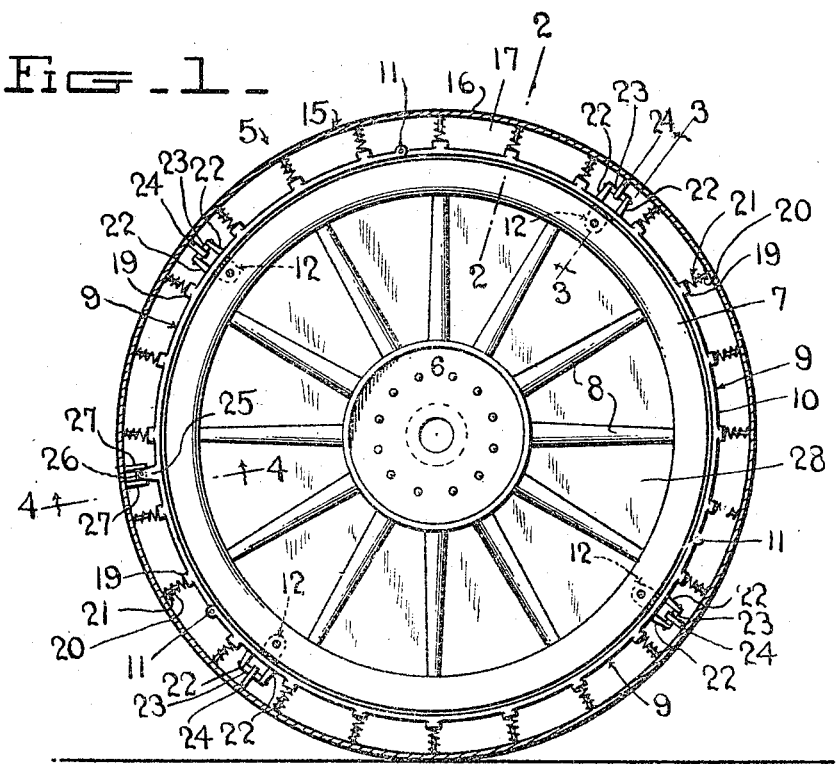
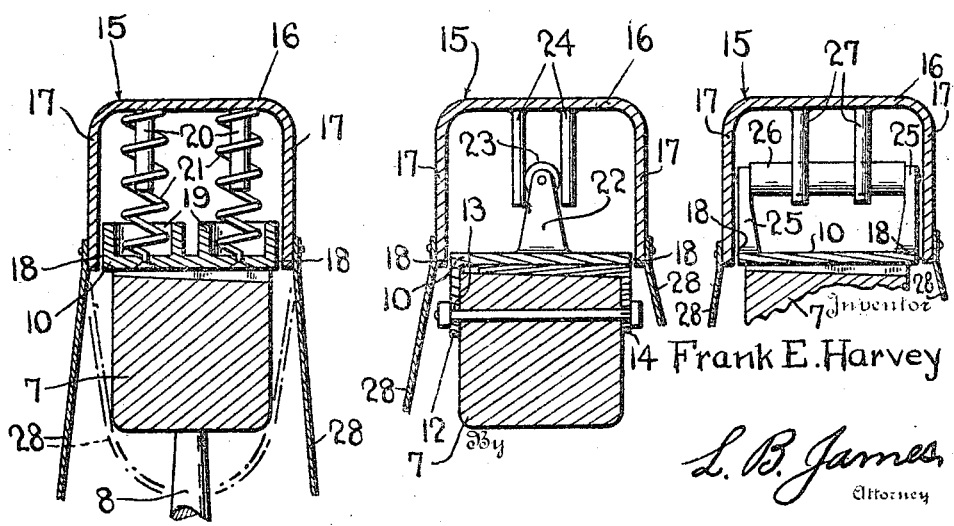
Frank E. Harvey
L. B. James
Attorney

UNITED STATES PATENT OFFICE.

FRANK E. HARVEY, OF WHITE HALL, ILLINOIS.

RESILIENT TIRE.

1,259,734. Specification of Letters Patent. Patented Mar. 19, 1918.

Application filed November 2, 1916. Serial No. 129,089.

*To all whom it may concern:*

Be it known that I, FRANK E. HARVEY, a citizen of the United States, residing at White Hall, in the county of Greene and State of Illinois, have invented certain new and useful Improvements in Resilient Tires, of which the following is a specification.

The present invention relates to improvements in resilient tires.

The primary object of the invention is the provision of a resilient tire, of such nature and construction as to replace the usual and necessary pneumatic tires, used upon wheels of automobiles or other like vehicles.

Another object of the invention is the provision of a tire, including a metallic outer rim with resilient means of connection between said outer rim and its support.

A still further object of the invention is the provision of means for preventing any undesired longitudinal or lateral movement between the rims.

A further object of the invention is the provision of means for preventing the entrance of dirt or other foreign substance between the rims.

A still further object of the invention is the provision of a tire, such as above referred to, which will be comparatively simple and inexpensive to manufacture, reliable and efficient in use, and easy of operation.

With the above and other objects in view, the present invention resides in the novel features of construction, formations, combinations and arrangements of parts to be hereinafter more fully described, claimed, and illustrated in the accompanying drawing forming a part of the present application, it being understood in this connection, that various minor changes in the specific details of construction can be resorted to within the scope of the appended claim, without departing from the spirit or sacrificing any of the advantages of the invention.

In the accompanying drawing above referred to,

Figure 1 is a view of the rear wheel of a vehicle, looking at the inner side thereof and showing the improved tire applied thereto and partly in section;

Fig. 2 is an enlarged detail sectional view taken on the line 2—2 of Fig. 1;

Fig. 3 is a similar view taken on the line 3—3 of Fig. 1; and

Fig. 4 is a corresponding view taken on the line 4—4 of Fig. 1.

Referring to the accompanying drawing by similar characters of reference throughout the several views, the numeral 5 designates in general a wheel of any well known type consisting of a hub 6, felly 7 and connecting spokes 8.

A plurality of segmental sections 9 suitably connected at their terminals as at 11, and forming a continuous circular inner rim 10, are secured to the outer side of the felly 7. The sections 9 are provided at one edge thereof, preferably their outer edge in order that the inner rim can be removed, with inwardly directed ears 12 which are perforated as at 13 for the reception of bolts or other suitable fastening elements which extend transversely through the said felly 7. Any preferred locking elements such as the plates 14 engage the opposite side of the felly 7 and adjacent edge of the rim 10. These elements 14 have openings therein through which the bolts above referred to pass and securely lock the inner rim 10 in its normal position upon the before mentioned felly.

An outer rim is shown at 15 and consists preferably of a circular body portion 16 which surrounds the inner rim 10 in spaced relation thereto in which position it is held by means to be hereinafter described in detail.

The outer rim 16 includes a pair of side flanges 17 which are preferably formed integral therewith. These side flanges 17 extend inwardly beyond the outer side of the inner rim 10 from which they are spaced slightly as at 18, in order that the outer rim will have a proper yielding movement relative to the before described inner rim.

At intervals throughout its length, the inner rim 10 is provided with a plurality of outwardly extended sockets 19 which can be formed integral therewith or secured thereto in any proper manner while extending from the inner side of the body of the outer rim 15 and in alinement with said sockets 19 are pins 20. These pins and sockets are arranged in transverse pairs but it is to be understood that any number may be employed depending entirely upon the width and size of the tire. Springs 21 are secured within the sockets and extend radially from the inner rim 10 surrounding the before described pins.

As shown in the drawing quite a number of the sockets 19, pins 20 and springs 21 are employed but it is to be understood that I am not to be limited to any number but may employ as many as would be required. It should be further understood that there is sufficient distance between the inner ends of the pins 20 and sockets 19 to allow sufficient play between the outer rim 15 and inner rim 10.

The tension of the springs 21 is such that the inner edges of the flanges 17 will at all times be held below the upper edge of the inner rim 10 in order to prevent any foreign particles from passing into the outer rim between the adjacent portions thereof and adjacent portions of the said inner rim.

Formed upon the inner rim sections 9 at suitable intervals are longitudinally spaced pairs of lugs 22 which can be secured thereto in any desired manner. Between the outer ends of these lugs 22 are journaled rollers 23 which operate between pairs of transversely spaced pins 24, which extend inwardly from the body 16 of the outer rim 15. This arrangement obviously prevents any undesired lateral movement between the inner and outer rims 10 and 15.

In order to prevent any longitudinal movement between the inner rim 10 and outer rim 15, a pair of transverse lugs 25 are formed or secured to the inner rim 10 in any manner and have journaled between the outer ends thereof a transversely disposed roller 26 which operates between pairs of longitudinally spaced pins 27. This obviously permits the inner and outer rims 10 and 15 to move to and from each other but prevents any longitudinal movement which would throw the various other parts out of alinement.

If desired any well known means for securing a tire to the outer side of the outer rim 15 can be employed. The purpose of this tire would be to eliminate noise when the wheel is passing over any hard surface. In order to insure the successful operation of the tire by preventing dirt or the like from entering its interior through the space 18, a covering 28 can be employed. This covering is preferably attached to the inner edges of the flanges 17 and to either the hub as shown by the full lines in the drawings or may pass around the felly 7 as shown in the dotted lines in Fig. 2 and have slots therein through which the spokes 8 pass. This obviously prevents sand, mud or other fine particles from working between the inner and outer rims and filling the same or interfering with the various operating elements contained therein.

From the foregoing description taken in connection with the accompanying drawing it will be manifest that a resilient tire is provided which will fulfil all of the necessary requirements of such a device.

Having thus fully described the invention what is claimed is;

In a resilient tire, the combination with an inner rim, of an outer rim spaced therefrom, flanges formed upon said outer rim and spaced from the opposite edges of said inner rim, resilient means connecting said outer and inner rims and holding them in spaced relation, longitudinal and transversely disposed rollers carried by the inner rim, and longitudinally and transversely spaced pins carried by the outer rim and engaging the rollers.

In testimony whereof I affix my signature in the presence of two witnesses.

FRANK E. HARVEY.

Witnesses:
R. S. WORCESTER,
CLAUDE LOWENSTEIN.

Copies of this patent may be obtained for five cents each, by addressing the "Commissioner of Patents, Washington, D. C."